Patented Feb. 16, 1943

2,311,202

UNITED STATES PATENT OFFICE 2,311,202

PROCESS OF REGENERATION OF AN ABSORPTION LIQUID CONSISTING OF BASIC ALUMINIUM SULPHATE FOR THE RECOVERY OF SULPHUR DIOXIDE

Josef Barwasser, Frankfort-on-the-Main, and Wilhelm Thumm, Oberursel, near Frankfort-on-the-Main, Germany, assignors to American Lurgi Corporation, New York, N. Y., a corporation of New York No Drawing. Application September 4, 1940, Serial No. 355,410. In Germany September 26, 1939

6 Claims. (Cl. 23—178)

The invention relates to a process of regeneration of an absorption liquid consisting of a basic solution containing aluminium sulphate used for the recovery of sulphur dioxide. It is known that in the so called regeneration-absorption process for the recovery of $SO_2$ from gases a basic solution of aluminium sulphate is used as the absorbent material from which $SO_2$ is expelled by heating and/or reduced pressure. The regenerated absorbent material is returned to the process for treating new quantities of gas. The lye contains for example 90–100 g. $Al_2O_3$ per liter of which about 40% are free hydroxide of aluminium ("basicity"=40%). For the exact working of the process it is very important to keep up this basicity which is particularly favourable for the absorption capacity of the lye. But its maintenance is so difficult that it has given rise to complicated processes and high costs of production. During the operation the concentration of sulphuric acid in the lye increases by the partial oxidation of the $SO_2$ of the gases and the basicity decreases. Moreover the presence of sulphur and $H_2S$ in the gas forms polythionic acids of which even small quantities cause certain troubles. According to the degree of purity of the gas the concentration of As—, Se— and metal compounds in the absorption liquid may also increase which favours the process of sulphation.

According to a known method the desulphation of the absorption liquid is carried out by precipitating with lime and filtering the gypsum. The polythionic acids formed are removed by boiling the lye with sulphate of copper. In using this method it is impossible to prevent a certain quantity of gypsum from remaining dissolved in the absorption liquid, so that therefore gypsum is eliminated in the absorption columns and in other apparatus which gives rise to troublesome clogging. Similarly when boiling with copper sulphate, excess copper penetrates into the filtrate and forms in the various apparatus such as heat interchangers, regeneration columns and distilling apparatus precipitates, for example of sulphides of copper, which are difficult to remove. Another special disadvantage consists in the fact that no absorption water can be eliminated and the same lye remains continuously in the plant. This gives rise to continual increase of impurities which are not precipitated by the lime when desulphating.

According to another known process for regenerating the basic solution of aluminium sulphate, not only lime but also metallic aluminium activated by mercury is added to a part of the said basic solution of aluminium sulphate. The dissolving of the metallic aluminium in the absorption liquid serves chiefly to restore the necessary quantity of basic aluminium sulphate which has decreased during the working operation because for example of leakage or precipitation of insoluble aluminous compounds, whereas the lime serves for the proper desulphation. As may be seen the same inconveniences arise as in working with lime alone, i. e., the troublesome impurities remaining in the system are continuously retained in the liquid in circulation whereby their concentration increases and they give rise to the troubles mentioned. Using only metallic aluminium increases the quantity of absorption liquid to an undesired extent.

According to the invention the described inconveniences are overcome by removing from time to time from the absorption liquid a partial quantity of the liquid proportional to the quantity of neutral aluminium sulphate, which has been formed, then adding to the absorption lye a quantity of aluminium in the form of aluminium hydroxide dissolved in sulfurous acid having an aluminium content equal to that of the partial quantity removed. This may be done by precipitating the aluminium in the form of aluminium hydroxide by precipitants resulting in the production of soluble sulphates, as for instance alkaline hydroxide (including ammonium or magnesium hydroxide) or alkaline carbonate, from the eliminated partial quantity of the absorption liquid to be regenerated. Then the filtered and washed precipitate is reduced to mud in water and brought into solution in the presence of sulphur dioxide of 100% strength. Instead of water a mixture of water and absorption lye or absorption lye only may be used for the suspension; nor does it matter if the precipitated aluminium hydroxide still contains a little aluminium sulphate and therefore still has an acid reaction, since the solution of aluminium sulfite prepared from the precipitate is returned to the main body of aluminium sulphate lye. The lye which has been separated from the precipitated aluminium hydroxide contains the percentage of sulphate to be eliminated as well as the hitherto very troublesome polythionic acids and other impurities as far as they have not been eliminated by the process of precipitation. If sodium and magnesium compounds are used then the lye contains sodium and magnesium sulfate which are eliminated. It may easily be understood that in this case the water balance in the absorption plant can also be better maintained than with the hitherto used methods. If ammonia is used the filtrate consists of a solution of ammonium sulphate which can be worked down to the solid salt. The ammonia can also be used by circulating it in the system. In this case the ammonia content must be released again from the solution of ammonia sulphate by treating the solution with quicklime and thus using the ammonia again.

For an $SO_2$ recovery plant with an output of 40 tons of $SO_2$ a day, calculated upon the new method of desulphation, the quantities of lye to be treated are as follows:

The aluminium hydroxide is precipitated by ammonia. If the sulphation amounts to 1%, then 200 kg. $SO_4$-sulphur a day are to be withdrawn from the absorption lye. This quantity is contained in 4 cbm. of lye. To these 4 cbm. of lye 250 kg. ammonia ($NH_3$) are added and 400 kg. of $Al_2O_3$ are precipitated. This precipitated aluminium hydroxide is filtered. The resulting filtrate is a solution of ammonium sulphate which may be evaporated for the production of the solid salt.

According to another method of carrying out the process in conformity with the invention the aluminium sulphate may also be produced from the lye to be regenerated either alone or together with lyes of aluminium sulphate of other origin.

According to the invention a plant producing aluminium sulphate on the basis of aluminium hydroxide and sulphuric acid, can economically easily combine the process of a sulphur dioxide enriching plant run upon the principles of the invention. In this case the cooperation of the two plants proceeds as follows:

In the same proportion as the sulphation of the basic lye of aluminium sulphate proceeds in the $SO_2$-enriching plant, a partial quantity of the lye is eliminated for the purpose of making up to the required basicity. Then after having been freed from inconvenient impurities such as iron etc. the eliminated lye is worked up to the crystallised neutral salt. For the lye of aluminium sulphate eliminated from the system of the $SO_2$-enriching plant, a quantity of aluminium hydroxide equal to the content of aluminium of the separated lye must be introduced in the $SO_2$-enriching. This quantity is removed from the aluminium sulphate production plant suspended in water or solution of aluminium sulphate and brought to solution in the presence of 100% $SO_2$.

The superiority of the process according to the invention compared with the hitherto used methods consists in the greater simplicity of the working operation and in a substantial reduction of the production costs.

We claim:

1. In a regenerative absorption process for the recovery of $SO_2$ wherein an aqueous solution of basic aluminum sulphate is employed as a circulating absorbent liquid wherein the desired basicity is gradually decreased because of the oxidation of dissolved $SO_2$ and the consequent production of normal aluminum sulphate, the steps which comprise periodically removing a portion of the absorption liquid containing a quantity of $SO_4$ substantially equal to that formed by the oxidation of the $SO_2$, treating such portion to precipitate the aluminum contained therein in the form of a hydroxide with a precipitant which produces a soluble sulphate, dissolving the resulting aluminum hydroxide in a quantity of sulphurous acid, and then adding such solution to the main body of the absorption liquid.

2. In a regenerative absorption process for the recovery of $SO_2$ wherein an aqueous solution of basic aluminum sulphate is employed as a circulating absorbent liquid wherein the desired basicity is gradually decreased because of the oxidation of dissolved $SO_2$ and the consequent production of normal aluminum sulphate, the steps which comprise periodically removing a portion of the absorption liquid containing a quantity of $SO_4$ substantially equal to that formed by the oxidation of the $SO_2$, treating such portion, to precipitate the aluminum contained therein in the form of a hydroxide, with a precipitant which produces a soluble sulphate, suspending the resulting aluminum hydroxide in a quantity of the absorption liquid, bringing it into solution in the presence of sulphur dioxide of 100% strength, and then adding such solution to the main body of the absorption liquid.

3. A process as claimed in claim 1 in which said precipitant is selected from the group consisting of alkaline hydroxides and carbonates which produce soluble sulphates.

4. In a regenerative absorption process for the recovery of $SO_2$ wherein an aqueous solution of basic aluminum sulphate is employed as a circulating absorbent liquid wherein the desired basicity is gradually decreased because of the oxidation of dissolved $SO_2$ and the consequent production of normal aluminum sulphate, the steps which comprise periodically removing a portion of the absorption liquid containing a quantity of $SO_4$ substantially equal to that formed by the oxidation of the $SO_2$, treating such portion, to precipitate the aluminum contained therein in the form of a hydroxide, with a precipitant which produces a soluble sulphate, suspending the resulting aluminum hydroxide in pure water, bringing it into solution in the presence of sulphur dioxide of 100% strength, and then adding such solution to the main body of the absorption liquid.

5. A process as claimed in claim 4 in which said precipitant is selected from the group consisting of alkaline hydroxides and carbonates which produce soluble sulphates.

6. In a regenerative absorption process for the recovery of $SO_2$ wherein an aqueous solution of basic aluminum sulphate is employed as a circulating absorbent liquid wherein the desired basicity is gradually decreased because of the oxidation of dissolved $SO_2$ and the consequent production of normal aluminum sulphate, the steps which comprise periodically removing a portion of the absorption liquid containing a quantity of $SO_4$ substantially equal to that formed by the oxidation of the $SO_2$, treating such portion, to precipitate the aluminum contained therein in the form of a hydroxide, with a precipitant which produces a soluble sulphate in such a quantity that the precipitate retains an acid reaction, suspending the resulting aluminum hydroxide in a quantity of the absorption liquid, bringing it into solution in the presence of sulphur dioxide of 100% strength, and then adding such solution to the main body of the absorption liquid.

JOSEF BARWASSER.
WILHELM THUMM.